UNITED STATES PATENT OFFICE.

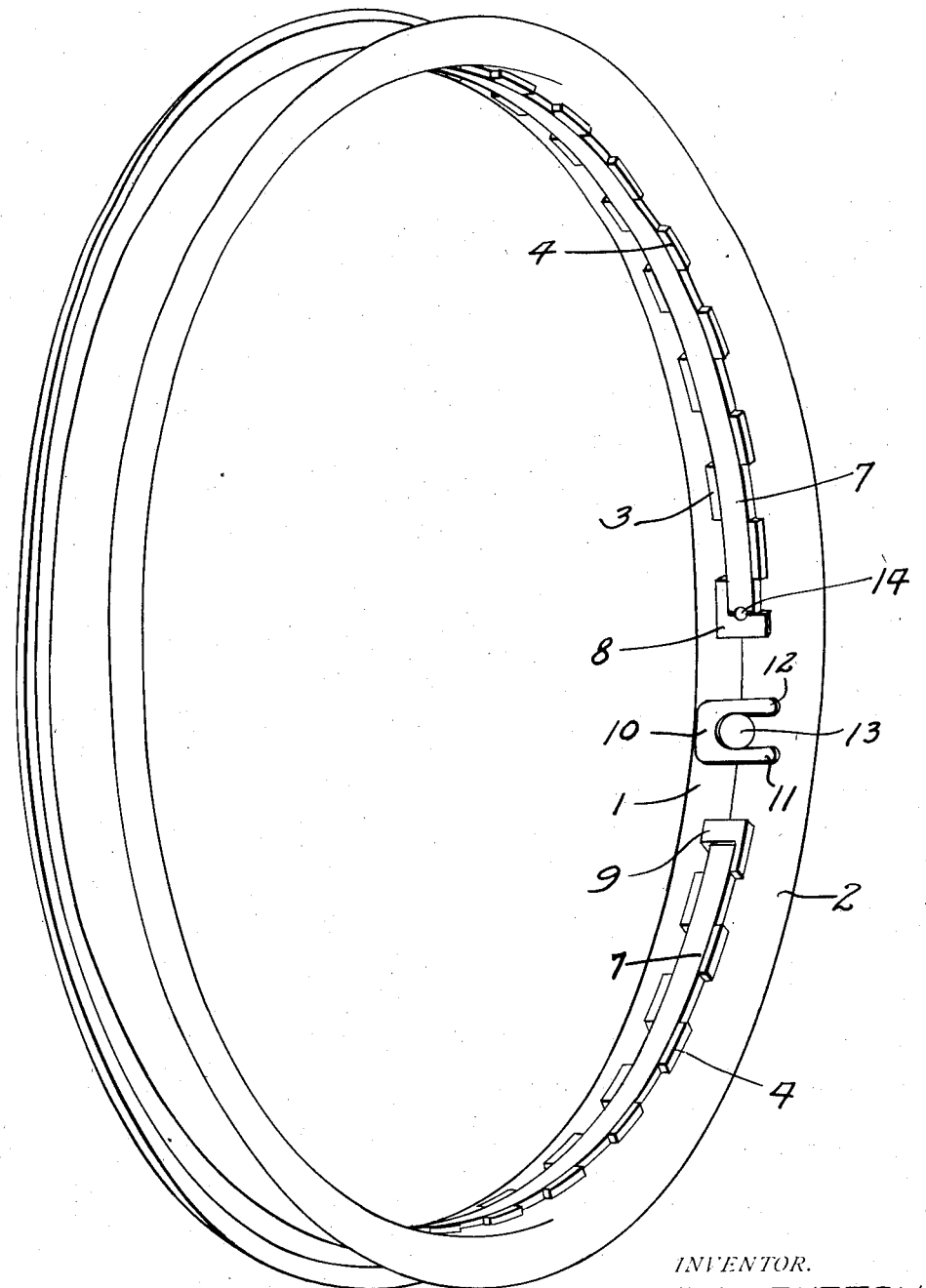

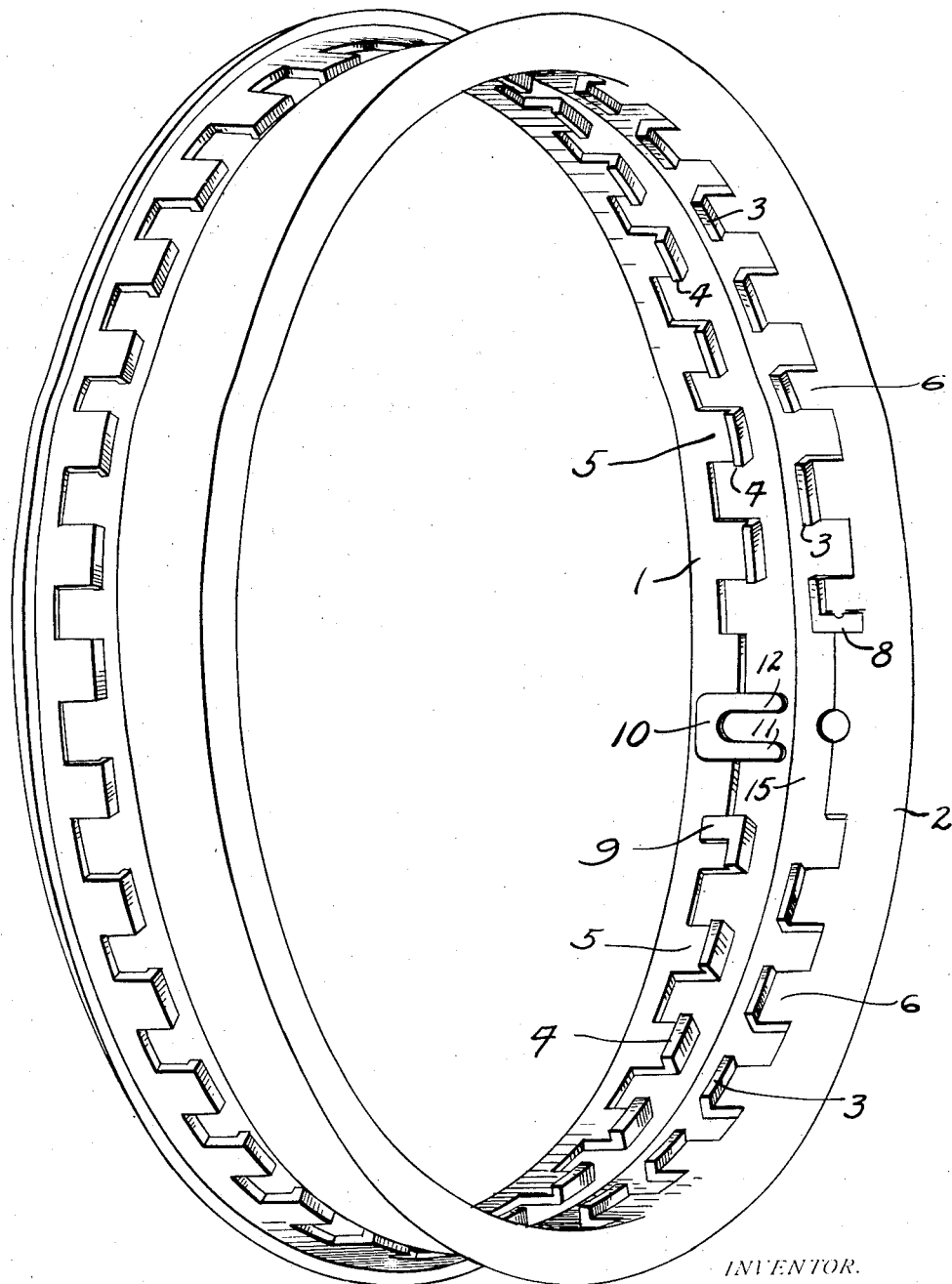

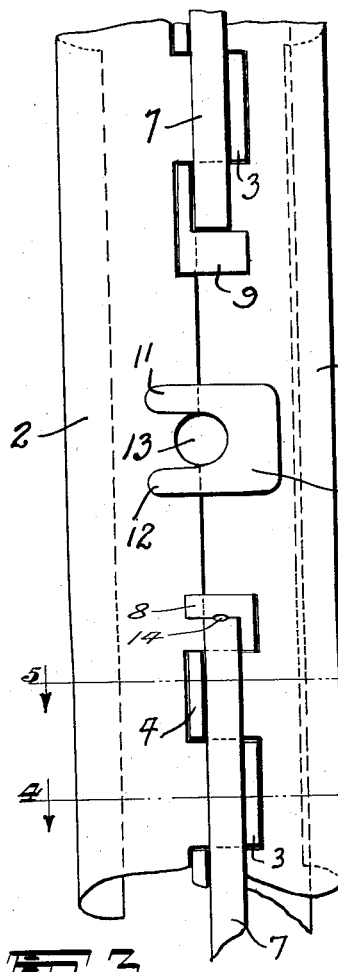
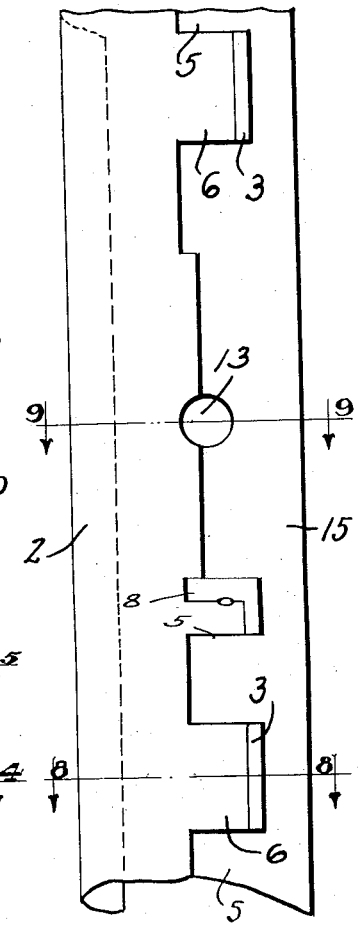
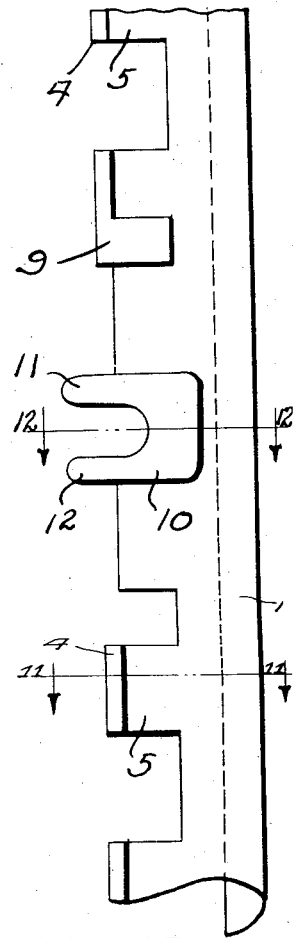
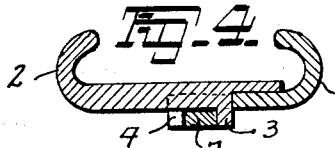
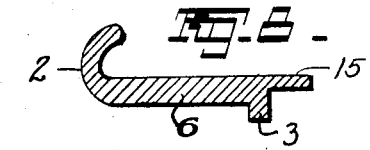
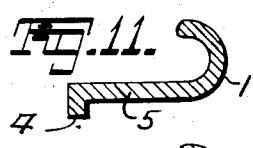
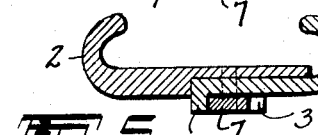
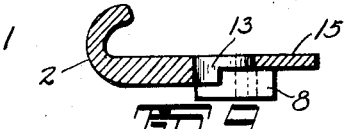
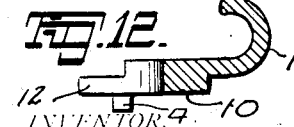
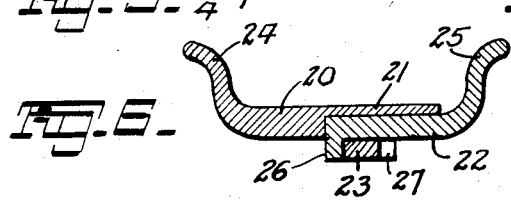

JOHN W. DUTTON, JR., OF STOCKTON, CALIFORNIA.

DEMOUNTABLE RIM.

1,265,310.  Specification of Letters Patent.  Patented May 7, 1918.

Application filed March 9, 1916. Serial No. 83,102.

*To all whom it may concern:*

Be it known that I, JOHN W. DUTTON, Jr., a citizen of the United States, residing at Stockton, in the county of San Joaquin, State of California, have invented a new and useful Demountable Rim, of which the following is a specification in such full and clear terms as will enable those skilled in the art to construct and use the same.

This invention relates to demountable rims for pneumatic tires and its object is to produce a strong rim which will positively hold the tire in place thereon and which can be readily assembled or disassembled with nothing more than a nail set, or small steel pin, or screw driver.

Another object of the invention is to provide a demountable rim capable of positively securing the tire thereon and which can be used in conjunction with the so-called cable base tires having inextensible beads, the rim being suitably split to enable it to be placed in the tire and having suitable locking means to secure the two parts of the rim together.

Another object of the invention is to provide a rim of sufficient width to receive the tire when the latter is being assembled on the rim in such a manner as to prevent the tire from interfering with the assembling of the remaining rim part, and to protect the inner tube from pinching or derangement.

An embodiment of the invention is shown in the drawing in which the same reference numeral is applied to the same portion throughout, but I am aware that there may be many modifications thereof.

Figure 1 is a perspective view of a rim completely assembled.

Fig. 2 is a perspective view of the rim parts as they appear when moved laterally one from the other after the removal of the locking ring.

Fig. 3 is a plan view of a development of a portion of the rim adjacent to the opening for the tube valve stem.

Fig. 4 is a cross section of the rim on the line 4—4, Fig. 3 looking in the direction of the arrows.

Fig. 5 is a cross section of the rim on the line 5—5, Fig. 3, looking in the direction of the arrows.

Fig. 6 is cross section of a rim having straight sides instead of clencher flanges.

Fig. 7 is a plan view of a development of a portion of one part of the rim adjacent to the tube valve stem hole.

Fig. 8 is a cross section of that portion of the rim shown in Fig. 7 on the line 8—8, Fig. 7.

Fig. 9 is a cross section on the line 9—9, Fig. 7.

Fig. 10 is a plan view of a development of a portion of the narrow part of the rim.

Fig. 11 is a cross sectional view on the line 11—11, Fig. 10 and

Fig. 12 is a cross sectional view on the line 12—12, Fig. 10 looking in the direction of the arrows.

The tire rim consists of two rings 1 and 2, each of which has oppositely placed lugs 3 and 4. The lugs 3 and 4 extend inwardly from the surfaces of the two rings 1 and 2 and are alternately placed and are carried by projecting members 5 and 6, which members interlock loosely one with another, said members being of loose enough fit to be readily assembled, while at the same time they are because of such looseness of fit not likely to rust together.

When the tire has been assembled on the rim and the parts 5 and 6 are interlocked together, a spring ring 7 is placed around the inner periphery of the rim between the lugs 3 and 4 so that it locks the two parts of the rim together. Stop blocks 8 and 9 determine the position of the ends of said ring 7 and the reinforcing plate 10 has prongs 11 and 12 which extend over the adjacent portion of the rim near the opening 13 through which the valve stem tube projects.

The ring 7 is provided with a hole 14 to enable a steel pin or nail set or screw driver to be inserted to lift the spring 7 out of engagement with the lugs 3 and 4 thereby permitting the two parts of the rim to be at once separated, after which the tire can be removed without difficulty. The locking ring 7 is made of a flexible spring steel bar rolled to a circular shape to exactly fit the inner diameter of the rim when sprung into place therein and at the same time it is intended that it shall fit it tight enough so that there will be practically no possibility of its dropping out.

That portion of the rim numbered 2 is provided with a protecting band or flange 15 which extends almost to the flange of the opposite rim part and which acts as a protection for the tube, from the lugs over which it extends, as well as providing means for assembling the tire.

The lugs 3 and 4 project inwardly the thickness of the ring 7 and when the tire has been placed on the rim and the two parts of the rim have been interlocked the spring ring 7 is pushed into place with one end abutting the block 9 and it is gradually worked around until the other end is worked into place abutting the block 8, and in reverse order the tire is removed from the rim by simply inserting the steel pin or nail set to lift the ring out from its position against the abutment 8, whereupon the two parts of the tire may be at once moved laterally away from each other, thereby immediately releasing the tire.

While the principal figures have illustrated the use of clencher tires with a demountable rim, it will be apparent to those skilled in the art that the so-called straight side tire, a rim for which is illustrated in Fig. 6, may be used equally well with this invention. In this figure the numeral 20 represents one portion of the rim which carries the protecting flange 21, 22 representing the other half of the rim and 23 representing the locking ring. In this instance the tire retaining flanges 24, 25 are curved outwardly for use with the straight side cable base tire, but the lugs 26, 27 are substantially the same as the locking lugs in the other form of the rim.

It will be understood that while this rim is especially adapted for use with pneumatic tires that it is equally capable of use with hard rubber tires, solid tires, or composition tires, as may be desired.

Having thus described my invention what I claim as new and desire to secure by Letters Patent of the United States, is as follows, express reservation being made of permissible modifications:

1. A demountable rim for pneumatic tires comprising a split rim, one portion of which is adapted to overlie the other portion of the rim and forming a broad abutment upon which the tire may be mounted, laterally and inwardly projecting locking lugs carried by each of the rim portions for securing them together, and a locking ring, the lugs of one portion of the rim bearing upon one side of the locking ring, and the lugs of the other portion of the rim bearing upon the opposite side of the locking ring.

2. A demountable rim for rubber tires comprising a split rim having laterally and inwardly projecting lugs, the lugs of one portion of the rim being adapted to interlock with the lugs of another portion thereof, a locking ring against which said lugs bear to secure the two parts of the rim together, and a guard plate carried by one portion of the rim and adapted to overlie the other portion thereof.

3. A demountable rim for rubber tires comprising a split rim having laterally and inwardly projecting lugs adapted to interlock with each other, a locking ring against which the inwardly projecting lugs bear to secure the two parts of the rim together, and two abutment blocks against which the ends of the ring bear when the parts of the rim are locked together.

In testimony whereof I have hereunto set my hand this 29th day of February A. D. 1916.

JOHN W. DUTTON, Jr.